(12) United States Patent
Klotzbuecher et al.

(10) Patent No.: US 7,791,528 B2
(45) Date of Patent: Sep. 7, 2010

(54) METHOD AND APPARATUS FOR RADAR SIGNAL PROCESSING

(75) Inventors: Dirk Klotzbuecher, Wuerzburg (DE); Walter Poiger, Saale (DE)

(73) Assignee: Autoliv ASP, Inc., Ogden, UT (US)

( * ) Notice: Subject to any disclaimer, the term of this patent is extended or adjusted under 35 U.S.C. 154(b) by 116 days.

(21) Appl. No.: 12/276,453

(22) Filed: Nov. 24, 2008

(65) Prior Publication Data

US 2010/0127915 A1 May 27, 2010

(51) Int. Cl.
G01S 13/00 (2006.01)
G01S 13/58 (2006.01)
G01S 13/08 (2006.01)

(52) U.S. Cl. .......................... 342/112; 342/70; 342/109; 342/127; 342/129; 342/132

(58) Field of Classification Search ............. 342/70–72, 342/105, 109–112, 127–133
See application file for complete search history.

(56) References Cited

U.S. PATENT DOCUMENTS

| | | | | |
|---|---|---|---|---|
| 3,872,475 A | * | 3/1975 | Yamanaka et al. | 342/111 |
| 4,450,444 A | * | 5/1984 | Wehner et al. | 342/25 F |
| 4,851,851 A | * | 7/1989 | Hane | 342/112 |
| 4,920,347 A | * | 4/1990 | Kurihara | 342/130 |
| 5,317,315 A | * | 5/1994 | Karhunen et al. | 342/26 B |
| 5,499,029 A | * | 3/1996 | Bashforth et al. | 342/22 |
| 5,731,778 A | * | 3/1998 | Nakatani et al. | 342/70 |
| 5,751,240 A | * | 5/1998 | Fujita et al. | 342/70 |
| 5,757,308 A | * | 5/1998 | Lissel et al. | 342/70 |
| 5,768,131 A | * | 6/1998 | Lissel et al. | 701/301 |
| 5,867,117 A | * | 2/1999 | Gogineni et al. | 342/22 |
| 5,920,280 A | * | 7/1999 | Okada et al. | 342/109 |
| 5,963,163 A | * | 10/1999 | Kemkemian et al. | 342/109 |

(Continued)

*Primary Examiner*—Thomas H Tarcza
*Assistant Examiner*—Peter M Bythrow
(74) *Attorney, Agent, or Firm*—Sally J Brown; Saul Ewing LLP (57) ABSTRACT

A radar apparatus and method for determining the range to and velocity of at least one object comprising, transmitting a plurality of RF signals, each comprising a particular frequency and being transmitted during a particular unique finite period, the plurality of signals collectively comprising at least one first subset of signals having the same frequency and at least one second subset of signals having different frequencies, receiving the plurality of signals after reflection from an object, determining a phase difference between each of the signals and the corresponding reflected signal, each piece of phase difference information herein termed a sample, organizing the samples in two-dimensions wherein, in a first dimension, all samples have the same frequency and, in a second dimension, all consecutive samples are separated from each other by a fixed time interval; processing the samples in the first dimension to determine a phase rotation frequency corresponding to the samples in the first dimension, the phase rotation frequency comprising a Doppler frequency for the at least one object, processing the samples in the second dimension to determine a second phase rotation frequency corresponding to the samples in the second dimension; the phase rotation frequency comprising Doppler frequency and range frequency for the at least one object; comparing the first phase rotation frequency to the second phase rotation frequency to distinguish range frequency from Doppler frequency of the at least one object; and converting the Doppler frequency to a velocity of the object and converting the range frequency to a range of the object.

19 Claims, 4 Drawing Sheets

U.S. PATENT DOCUMENTS

| | | | |
|---|---|---|---|
| 6,222,933 B1 * | 4/2001 | Mittermayer et al. | 382/109 |
| 6,320,531 B1 * | 11/2001 | Tamatsu | 342/109 |
| 6,380,882 B1 * | 4/2002 | Hegnauer | 342/28 |
| 6,396,436 B1 * | 5/2002 | Lissel et al. | 342/70 |
| 6,686,871 B2 * | 2/2004 | Rohling et al. | 342/109 |
| 6,703,967 B1 * | 3/2004 | Kuroda et al. | 342/111 |
| 6,903,678 B2 * | 6/2005 | Kumon et al. | 342/70 |
| 6,911,934 B2 * | 6/2005 | Henftling et al. | 342/28 |
| 6,924,762 B2 * | 8/2005 | Miyake et al. | 342/70 |
| 7,205,932 B2 * | 4/2007 | Fiore | 342/133 |
| 7,466,260 B2 * | 12/2008 | Ishii et al. | 342/70 |
| 7,528,768 B2 * | 5/2009 | Wakayama et al. | 342/196 |
| 7,598,904 B2 * | 10/2009 | Klotzbuecher et al. | 342/107 |
| 7,667,637 B2 * | 2/2010 | Pedersen et al. | 342/107 |

* cited by examiner

FIGURE 1

Doppler Dominant Matrix

| 0 | 4 | 8  | 12 |
|---|---|----|----|
| 1 | 5 | 9  | 13 |
| 2 | 6 | 10 | 14 |
| 3 | 7 | 11 | 15 |

FIGURE 2A

Range Dominant Matrix

| 0  | 1  | 2  | 3  |
|----|----|----|----|
| 4  | 5  | 6  | 7  |
| 8  | 9  | 10 | 11 |
| 12 | 13 | 14 | 15 |

METHOD AND APPARATUS FOR RADAR SIGNAL PROCESSING

FIELD THE INVENTION

The invention pertains to radar technology. More particularly, the invention pertains to methods and apparatus for processing continuous wave radar signals to maximize performance and/or increase flexibility of a radar system.

BACKGROUND OF THE INVENTION

Radar has countless applications in modern life. Due to the continuing reduction in size and cost of digital signal processing chips, radar is now being incorporated into consumer products. For instance, radar technology has become sufficiently low cost to be incorporated into cars and other motor vehicles to provide parking assistance systems, collision avoidance systems, and air bag deployment systems (pre-crash detection).

It might be desirable to optimize the parameters of the radar system differently depending on the particular task being performed by the radar. Using vehicle-mounted radar systems as an example, in parking assistance, the radar is used to warn the driver how close the vehicle is to obstacles (including small obstacles that the driver may not be able to see through the rear window or the mirrors). Accordingly, in parking assistance, only obstacles that are relatively close to the vehicle, e.g., within 2 m, are of interest. Hence, the distance over which the radar must perform is very small, typically between 0-2 m. On the other hand, it is important to detect relatively small obstacles such as parking meter poles, fire hydrants, and curbs. Thus, the range spectrum of the radar can be small. However, on the other hand, the range resolution of the radar (in terms of the ability to detect small objects, resolve multiple, closely-spaced objects from each other and determine the range to an obstacle within a few cm) must be high. For instance, when parking, the difference between an object being 20 cm or 50 cm from the rear bumper of the vehicle is a significant difference. Also, Doppler resolution, i.e., resolution of the velocity of an obstacle relative to the car may not be that significant for parking assistance since the vehicle typically is moving relatively slowly during parking.

On the other hand, when a vehicle-mounted radar system is used for collision avoidance, an entirely different set of concerns are significant. For instance, in a collision avoidance system, the radar is used to detect moving vehicles and other obstacles at much greater distances, such 30, 60, or even 100 m from the car, and the relative velocity of obstacles can be much greater, e.g., 100 km/h or greater, as compared to parking assistance. On the other hand, the high range resolution of a few centimeters or so that is desirable for parking assistance is not required for collision avoidance applications.

Accordingly, optimizing the parameters of the radar system for one of these two exemplary applications of a vehicle-mounted radar system almost inherently dictates that it is not optimized for the other application.

The following discussion focuses on the issue of determining the range to an object and the relative velocity of the object. However, it should be understood that virtually any practical radar system also will employ additional processing and/or hardware to determine the bearing to an object, which is not significantly discussed in this specification.

There are many different well-known techniques for processing radar signals to determine the range of objects, to resolve different objects from each other, and to determine the relative velocity of objects. For instance, in pulsed radar systems, the radar sends out a transmit pulse and waits for a reflection to come back. The reflected signal is fed into one input port of a mixer and the transmitted signal is fed into the other input port of the mixer after being passed through a delay line. The output of the mixer is converted to digital by an analog-to-digital converter and the digital information is processed in a digital signal processor to determine the delay between the transmission of the pulse and the receipt of the reflection, which, of course, is directly convertible into the round trip distance between the radar antenna and the obstacle that reflected the signal by multiplying the delay by the speed of light. In pulsed radar, the amount of digital signal processing is relatively small, since the output of the hardware (the output of the mixer) requires relatively little further processing to derive range information.

Initially, pulsed radar systems were favored for consumer and other low-cost radar applications because pulsed radar systems were hardware intensive, as opposed to processing intensive. In other words, a pulsed radar system requires relatively little processing power because most of the work is performed by hardware, e.g., switches, oscillators, delay lines, and mixers. However, as digital signal processing technology continues to improve at a rapid pace, radar techniques that rely more heavily on digital signal processing, rather than hardware, are becoming more and more attractive. The cost of hardware remains relatively steady, while the cost of digital signal processing decreases at a rapid pace.

One radar modulation technique that requires relatively little hardware, but significant signal processing power, and that is becoming more popular for consumer-type radar applications as digital signal processing becomes less and less expensive, is the frequency modulated continuous wave (FMCW) technique. There are several different types of FMCW radar modulation techniques. However, they all have in common the fact that the radar transmit signal is frequency modulated over time. Some of the better-known FMCW radar modulation techniques are frequency shift keying (FSK) and stepped frequency modulation.

In classical FMCW modulation techniques, the transmit signal of the radar is continuously swept from a minimum frequency to a maximum frequency over a period of time. This is commonly called a chirp. The chirp is repeated a plurality of times and the reflection information from the plurality of chirps is collected, correlated, and processed to generate sufficient data to permit calculation of useful results, such as the number of objects in the field of view of the radar, their ranges, bearings, sizes, and/or velocities.

Another FMCW modulation technique is FSK (frequency shift keying). In radar systems that utilize FSK modulation techniques, the radar sequentially transmit signals of two different frequencies. The signals reflected off of an obstacle back to the radar will have a certain phase difference relative to the corresponding transmit signals, which phase difference depends on the distance to the object (let us assume for sake of simplicity that the object is stationary, since velocity also would affect the phase difference). This is true for each of the two transmit frequencies transmitted by the radar. The phase difference between the transmitted signal and the received signal for the first frequency signal and the phase difference between the transmitted signal and the received signal for the first frequency signal are different from each other.

The phase difference between the transmitted signal and the reflected signal for any one frequency does not provide enough information to determine the range to an obstacle. Particularly, the difference in phase between the transmitted signal and the received signal does not disclose how many wavelength cycles exist in the round-trip delay between transmitted signal and received reflection signal. In other words, the phase difference data provides fine tuning with respect to range resolution (e.g., a phase difference of 180° discloses that the obstacle is X.5 wavelengths away—roundtrip—, but does not disclose the value of the integer X). However, phase difference information at two or more different frequencies can be correlated to each other to determine range.

With only two transmit frequencies, FSK modulation techniques cannot provide range measurement data unless there are at least two objects within the field of view of the radar that are moving at different velocities relative to the radar. However, by increasing the number of frequencies transmitted, one can increase the number of obstacles that can be resolved. Radar modulation techniques that utilize many frequency steps per measurement cycle are known as stepped frequency modulation techniques.

The above discussion assumed that the obstacles are not moving. In a real-world situation in which the obstacles may be moving or stationary, another layer of complexity in the signal processing is introduced. Particularly, by means of the well-known Doppler Effect, when an obstacle is moving relative to the radar antenna, the signal reflected off that object will be shifted in frequency from the transmitted signal. This frequency shift also will alter the perceived phase difference between the transmitted signal and the corresponding received, reflected signal.

Accordingly, even more complex modulation techniques and signal processing is necessary to provide sufficient information to distinguish the portion of the phase difference data that is the result of the Doppler Effect from the portion of the phase difference data that is the result purely of the range to the detected obstacle.

One well-known technique for distinguishing the Doppler effect from the range effect is to employ a sort of frequency chirping technique in which the set of frequency steps (hereinafter a frequency step cycle) is repeated a number of times sequentially, with each frequency step cycle being shifted in frequency from the preceding frequency step cycle. A first plurality of these sequential frequency step cycles will be shifted in frequency relative to each other in a first sequential direction, e.g., up. This will be followed by a second plurality of frequency step cycles shifted in frequency relative to each other in the opposite direction, e.g., down. The set of up-chirped frequency step cycles plus the set of down-chirped frequency step cycles collectively comprises one complete measurement data set (from which the range and velocity of obstacles can be calculated).

Merely as an example, the first frequency step cycle may comprise sweeping the frequency of the transmitted signal over a range of 200 MHz, from 4.000 GHz to 4.200 GHz, linearly in 10 steps of 20 MHz each. Thus, the first stepped frequency cycle comprises transmit signals at 4.0000 GHz, 4.020 GHz, 4.040 GHz, 4.060 GHz, . . . 4.160 GHz, 4.180 GHz, and 4.200 GHz. The second stepped frequency cycle comprises the same number of frequency steps, i.e., 10, each frequency step separated from the preceding frequency step by the same 20 MHz and the cycle spanning the same range of 200 MHz, but instead starting at 4.100 GHz. This continues for a number of stepped frequency cycles, e.g., five. For instance, the third cycle would start at 4.200 GHz, the fourth cycle would start at 4.300 GHz, and the last cycle would start at 4.400 GHz.

Next, this will be followed by a plurality of down-chirped stepped frequency cycles. For instance, the next frequency stepped cycle starts again at 4.0000 GHz and comprises transmit signals at 4.0000 GHz, 4.020 GHz, 4.040 GHz, 4.060 GHz, 4.080 GHz, . . . , 4.160 GHz, 4.180 GHz, and 4.200 GHz. The following stepped frequency cycle comprises the same number of frequency steps, each frequency step separated from the preceding frequency step by the same 20 MHz and spanning the same range of 200 MHz, but instead starting at 3.9000 GHz. This continues for a number of stepped frequency cycles. For instance, the third cycle would start at 3.800 GHz, the fourth cycle would start at 3.700 GHz, and the last cycle would start at 3.600 GHz.

If an object is moving relative to the radar, the observed phase rotation for that obstacle will be different than if it was stationary for each different stepped frequency cycle in one and only one of the up-chirped set of stepped frequency cycles or the down-chirped set of stepped frequency cycles. Whether that change in phase rotation appears in the up-chirped sequence or down-chirped sequence depends on whether the obstacle is moving toward or away from the radar antenna. In any event, that difference will be the result of only the Doppler Effect because the portion of the overall phase rotation that is a function of the range to the object is unaffected by the up or down chirping of the stepped frequency cycles. Accordingly, the portion of the phase rotation that is the result of the Doppler Effect can be isolated by comparing the data from the up chirped sequence of stepped frequency cycles to the data from the down-chirped sequence of stepped frequency cycles.

Hence, it is possible to determine the, range and velocity of a plurality of obstacles in the field of view of the radar.

While frequency up and down chirping provides the information necessary to differentiate velocity from range, it decreases the signal to noise ratio of the overall result for a given ramp rate of the chirped signal and velocity of the object by about 3-6 dB because the amount of time over which the data can be integrated is cut in half. Particularly, in one complete measurement cycle, half of the time is spent up chirping and half of the time is spent down chirping and the data from the up chirping sequence must be processed largely separately from the data from the down chirping sequence.

Some of the many advantages of FMCW techniques over pulsed radar techniques include the fact that, although the transmit signal generally has a broader bandwidth than the transmit signal in pulsed radar modulation techniques, the bandwidth of the post-mixer signals is typically much narrower, which reduces the data acquisition speed required of the signal processing circuitry. Accordingly, FMCW is less prone to interference from other RF sources and is much less prone to causing interference in other RF receivers.

While the preceding discussion has been at the conceptual level, it will be understood by those of skill in, the art of radar signal processing that the required signal processing is actually very processor intensive. For instance, much of the information used in determining the range and velocity information comprises phase data taken over a plurality of time and frequency intervals. It is difficult to process such phase information in the time domain. Accordingly, it is common to convert the phase information collected over the plurality of samples into a different form, such as a histogram or into the frequency domain (e.g., via Fourier transform) and process the data in the frequency domain before ultimately converting back to the time domain and/or generating range and velocity information.

It should be clear from the discussion above that the most relevant information collected in the stepped frequency modulation technique essentially is the changes in phase of the reflected signals over time and transmit signal frequency (often referred to in the related industries as "phase rotation"). It will be appreciated by those of skill in the related arts that a change in phase over time (i.e., phase rotation) essentially is a "frequency". Therefore, converting the data to the frequency domain, such as by Fast Fourier Transform (FFT), directly yields range and velocity information of the obstacles in the field of view of the radar.

The frequency corresponding to this change in phase shall hereinafter be termed the phase rotation frequency. As noted above, there are two phenomena that collectively dictate the phase rotation frequency, namely, the range of the object and the relative velocity of the object (or Doppler shift). For purposes of clarity and ease of discussion, the portion of that frequency that is the result of Doppler shift (i.e., the velocity of an obstacle) is referred to herein as the Doppler frequency and the portion that is the result of the range of the obstacle is herein referred to as the range frequency.

SUMMARY OF THE INVENTION

According to a first aspect of the invention, a radar method for determining the range to at least one object and a velocity of the object comprises transmitting sequentially a plurality of RF signals, each of the plurality of RF signals comprising a particular frequency and being transmitted during a particular unique finite period, the plurality of signals collectively comprising at least one first subset of signals having the same frequency and at least one second subset of signals having different frequencies, receiving the plurality of signals after reflection from an object, determining a phase difference between each of the signals and the corresponding reflected signal, each piece of phase difference information herein termed a sample, organizing the samples in two-dimensions wherein, in a first dimension, all samples have the same frequency and, in a second dimension, all samples have different frequencies; processing the samples in the first dimension to determine a phase rotating frequency corresponding to the samples in the first dimension, the phase rotation frequency comprising a Doppler frequency for the at least one object, processing the samples in the second dimension to determine a second phase rotation frequency corresponding to the samples in the second dimension, the second phase rotation frequency comprising Doppler frequency and range frequency for the at least one object; comparing the first phase rotation frequency to the second phase rotation frequency to distinguish range frequency from Doppler frequency of the objects; and converting the Doppler frequency to a velocity of the object and converting the range frequency to a range of the object.

In accordance with a second aspect of the invention, a computer program product comprises computer executable code for controlling a radar system to transmit radar signals and to process received data as to the reflections of the transmitted radar signals, the computer program product comprising computer executable aide for causing the radar system to sequentially transmit a plurality of radio frequency signals, each of the plurality of radio frequency signals comprising a particular frequency and being transmitted during a particular unique finite time period, said plurality of signals collectively comprising a subset of signals having the same frequency and a subset of signals having different frequencies, computer executable code for receiving the plurality of transmitted signals after reflection from an object; computer executable code for determining a phase difference between each of the transmitted signals and the corresponding reflected signal, each piece of phase difference information herein termed a sample; computer executable code for organizing the samples in two-dimensions wherein, in a first dimension all samples have the same frequency and, in a second dimension, all samples have different frequencies; computer executable code for processing the samples in the first dimension to determine a first phase rotation frequency information corresponding to the samples in the first dimension, the first phase rotation frequency comprising only Doppler frequency information for objects in a field of view of the radar system; computer executable code for processing the samples in the second dimension to determine second phase rotational frequency information corresponding to the samples and the second dimension, the second phase rotation frequency comprising Doppler frequency information and range frequency information for objects in the field of view of the radar systems; computer executable code for comparing the first phase rotation frequency to the second phase rotation frequency to distinguish a range frequency from a Doppler frequency for the objects in the field of view of the radar system; and computer executable code for converting the Doppler frequency information to information as to the velocities of the objects in the field of view of the radar system and for converting the range frequency information to information as to the range of the objects in the field of view of the radar system.

In accordance with a third aspect of the invention, a radar system is provided comprising an antenna, a transmitter coupled to the antenna for producing radio frequency signals to be transmitted by the antenna, a receiver coupled to the antenna for receiving reflected signals received responsive to the transmitted signals, means for causing the transmitter antenna to sequentially transmit a plurality of radio frequency signals, each of the plurality of radio frequency signals comprising a particular frequency and being transmitted during a particular unique finite time period, the plurality of signals collectively comprising at least one first subset of signals having the same frequency and at least one second subset of signals having different frequencies, means for determining a phase difference between each of the transmitted signals and the corresponding reflected signal, each piece of phase difference information herein termed a sample, means for processing samples corresponding to the same transmit frequency to determine first phase rotation frequency, the first phase rotation frequency comprising only Doppler frequency information for objects in a field of view of the radar system, means for processing samples corresponding to transmit signals that were sequentially separated from each other by a fixed time interval to determine second phase rotation, frequency, the second phase rotation frequency comprising Doppler frequency information and range frequency information for objects in the field of view of the radar system, and means for comparing the first phase rotation frequency to the second phase rotation frequency to distinguish range frequency from Doppler frequency for the objects in the field of view of the radar system.

DETAILED DESCRIPTION OF THE INVENTION

For sake of clarity, let us review some of the terminology utilized hereinabove. A "sample" is a single instance of the radar system transmitting a transmit signal of a given frequency and receiving the reflected return signal. A stepped frequency sweep is a plurality of samples taken at a plurality of different transmit signal frequencies over a defined frequency range in defined frequency steps. An up-chirped sequence is a plurality of stepped frequency sweeps in which each stepped frequency sweep has a higher frequency range than the preceding stepped frequency sweep. A down-chirped sequence is a plurality of stepped frequency sweeps in which each stepped frequency sweep has a lower frequency range than the preceding stepped frequency sweep. The information contained in a sample is the phase difference between the transmitted signal and the corresponding received signal. A "complete measurement set" refers to the plurality of samples that are processed collectively to provide one data point of range and velocity information for obstacles in the field of view of the radar. For instance, in the exemplary discussion in the Background of the Invention section above, a complete measurement set comprises one up-chirped sequence and one down-chirped sequence.

In the prior art, the phase rotation frequency information over the number of samples comprising a complete measurement set was processed sequentially (i.e., linearly or as one dimensional data).

It should be understood that a radar system typically will continuously collect complete data sets during use. Depending on the particular application, each complete data set may be used separately from each other data set to provide separate snapshots of a scene under observation (the field of view of the radar system). However, in more complex systems, the plurality of complete data sets (snapshots) may be further correlated with each other to provide a "motion picture" of a scene. For instance, in vehicle mounted radar systems, it might be valuable to know not only the instantaneous position of vehicles in front of a car, but also to develop an understanding of what those vehicles are doing over time in order to predict what those vehicles will do in the future. This is known as a tracking algorithm or predictor in radar parlance. The snapshots individually do not provide information as to the trajectory of a moving object (e.g., a car moving at 100 km/h at a 45° angle to the radar and a car moving at 50 km/h directly toward the radar have the same radar signature in a single snapshot). The information that there is a vehicle in front of the radar system that is traveling at 100 km/h, while valuable is much less useful than information that the vehicle has been moving directly toward the radar on the same trajectory for several seconds.

Processing the collected sample data as one dimensional data makes the signal processing rather inflexible. Specifically, depending largely on the hardware and software in the system, there is a certain amount of processing power available in the radar system. Thus, essentially, there is a certain maximum number of samples per period of time that the system is capable of collecting and processing. Accordingly, in determining the sequence in which the samples are collected, a compromise must be made between range resolution and Doppler resolution. For instance, the greater the number of samples taken at the same frequency in one complete measurement set, the finer the Doppler resolution. On the other hand, the greater the number of steps of a given frequency deviation in a stepped frequency spectrum, the finer the range resolution. Particularly, increasing the number of frequency steps without changing the frequency deviation per step will increase the frequency spectrum of the sweep. This, consequently, increases the range resolution because the range resolution is dictated by the wavelength that corresponds to the frequency spectrum of the measurement set, e.g., 200 MHz in the examples described in the Background of the Invention section hereinabove. Specifically, in order to resolve two objects, they must be separated by at least one range bin; hence the condition that the range resolution is twice the wavelength corresponding to the frequency spectrum of the stepped radar signal. As an example, if the frequency of the transmitted signal is swept from 4.000 GHz to 4.200 GHz, the range resolution of the system will be half the wavelength corresponding to 200 MHz (about 0.75 m).

Also, note that, on the other hand, if instead one were to maintain the sweep spectrum while increasing the number of frequency steps, i.e., decrease the frequency deviation between each step, this would have no effect on the range resolution, but instead would increase the range spectrum of the radar system.

Therefore, in the traditional linear or one dimensional thinking of the prior art, it is difficult to alter the modulation technique and the signal processing technique of a given radar system to accommodate different Doppler resolution or range spectrum resolutions after it is designed.

The present invention provides a modulation technique and signal processing technique that utilizes two-dimensional analysis in order to permit altering the trade-off between Doppler resolution and range spectrum (as well as other parameters) on the fly. Utilizing the present invention, a vehicle-mounted radar system easily can be optimized, for instance, to maximize Doppler resolution when used for parking assistance in one operational mode and then switched to another mode that maximizes range spectrum when used for longer range collision avoidance. The switching between the two modes might be performed as a function of the speed of the vehicle or the gear that the transmission of the vehicle is in, since a vehicle is typically traveling at very low velocities during parking as compared to during normal driving.

In any event, in accordance with the principles of the invention, the samples taken during one complete measurement set are arranged relative to each other in two dimensions. For instance, they can be arranged in a two-dimensional matrix. The matrix is organized such that all of the samples in a given column of the matrix have the same transmit frequency and all of the samples in a given row of the matrix have a different transmit frequency.

In this manner, all of the samples in a given row have different transmit signal frequencies. On the other hand, all of the samples in a giving column have the same transmit frequency. Converting the data for each row and each column in the matrix into the frequency domain, one can calculate the phase rotation frequency of each individual row as well as the phase rotation frequency of each individual column.

Since all of the samples in any single column were taken at the same transmit frequency, the phase rotation frequency of each individual column contains only the Doppler frequency component and no range frequency component. On the other hand, all of the samples in any single row were taken at different frequencies and thus the phase rotation frequency of each individual row is comprised of both a Doppler frequency component and a range frequency component.

Thus, by comparing the phase rotation frequencies of the rows in the matrix to the phase rotation frequencies of the columns in the matrix, one can differentiate the portion of phase rotation frequency that is the result of the Doppler Effect from the portion of phase rotation frequency that is the result of the range to the obstacle.

This two-dimensional approach provides a simple way of organizing the collected data to distinguish the Doppler frequency from the range frequency. Furthermore, one can easily adjust the matrix to optimize it for a given application. If Doppler resolution (i.e., velocity resolution) is more important than maximizing the range spectrum of the radar, the number of frequency bins in each stepped sweep frequency can be increased and the number of stepped frequency sweeps in a complete measurement set can be decreased (i.e., the number of columns in the matrix can be increased and the number of rows decreased). In other applications, it may be desirable to increase the range spectrum while sacrificing velocity resolution by increasing the number of rows in the matrix and decreasing the number of columns.

Figure 1:
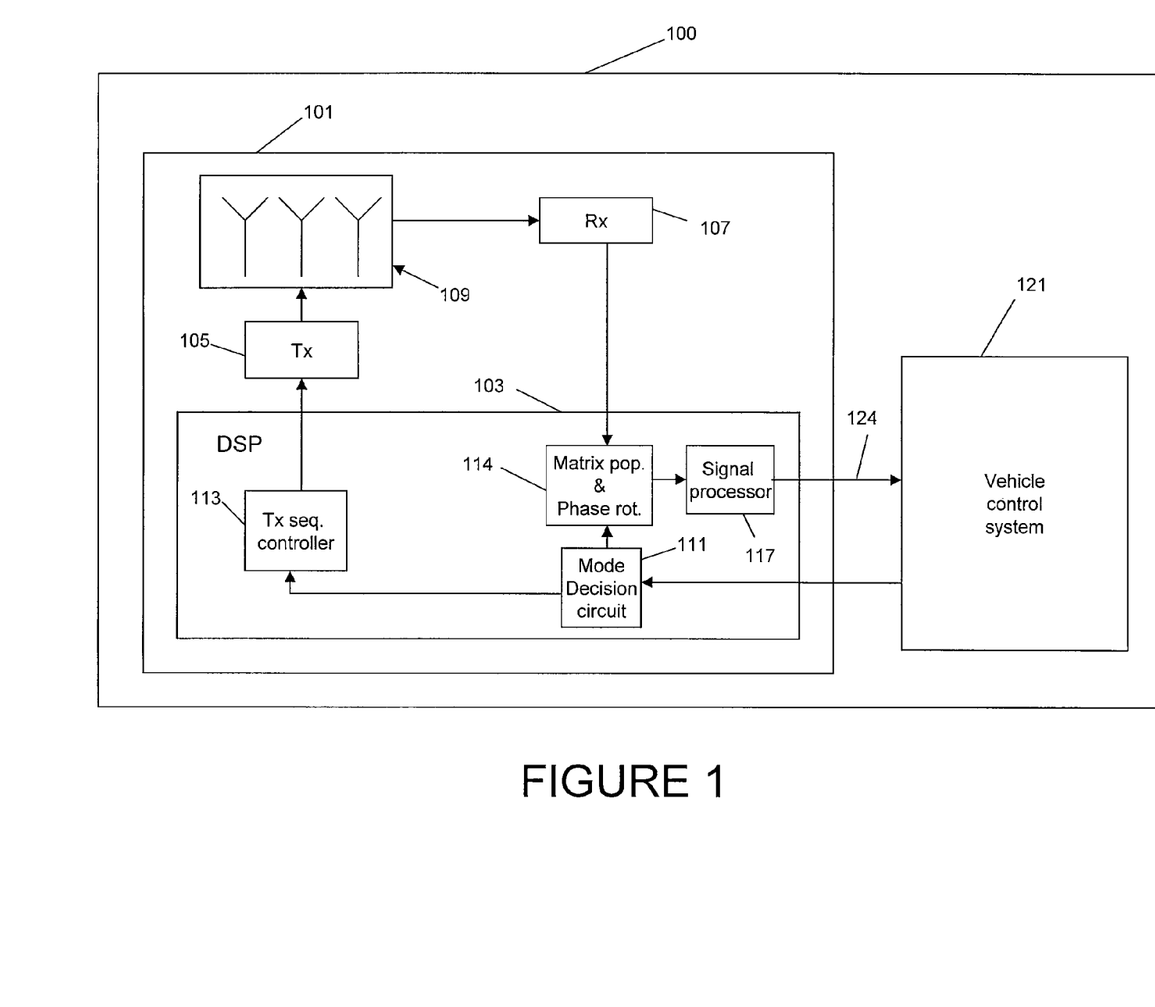
FIG. 1 is a block diagram of the logical components of a radar system in accordance with one embodiment of the present invention.

FIG. 1 is a block diagram of the logical components of a radar system in accordance with one exemplary embodiment of the present invention. While at least some of the blocks represent at least in some part hardware, it should be noted that this is a logical diagram illustrating the logical components of the system. Thus, for instance, the individual blocks shown in the digital signal processor (DSP) 103 do not necessarily represent physically separate hardware or even software components. These blocks correspond more to a logical separation of the tasks performed.

In any event, the system 100 comprises the radar system 101 and a vehicle control system 121. The vehicle control system 121 is intended to generally represent software and hardware in the vehicle that is technically not part of the radar system but that is used by the radar system. As this might include alarms that are activated responsive to the radar system, such as an audio proximity indicator to alert the driver when he is about to hit something while parking, or a circuit or software that generates a signal to the radar system 101 indicating what gear the car is in or what speed the car is traveling at.

In any event, the radar comprises one or more antennas 109. Typically, in order to accurately determine bearing in a vehicle radar system, there will be at least three transmit antennas spaced from each other. Also, there typically will be multiple receive antennas, although it is common for each antenna to be utilized as both a transmitting and receiving antenna. Thus, in a typical radar system there might be four laterally spaced transmit/receive antennas in the bumper of the vehicle.

In the particular embodiment illustrated in FIG. 1, the radar system 101 is used for two distinct tasks, namely, parking assistance and collision avoidance. Accordingly, a mode decision circuit 111 in DSP 103 receives a signal through the vehicle control system 121 indicative of what mode the radar system should be in. For instance, as previously noted, this may be a signal indicating the gear that the car is in or the speed at which the car is traveling since, if the car is in reverse or first gear and/or is moving slowly, the vehicle operator is probably in need of parking assistance as opposed to collision avoidance. However, if the car is moving forward in a higher gear or a higher rate of speed, it is very unlikely that the driver is parking and therefore the system should be in collision avoidance mode. In any event, mode decision circuit 111 provides a signal to both a transmit sequence controller 113 and a phase rotation and matrix population module 114. Transmit sequence controller 113, responsive to the mode signal from mode decision circuit 111 controls the transmit module 105 to send signals to the antenna 109 particularly adapted to the selected mode. For instance, if the selected mode is collision avoidance, then the transmit sequence may be adopted to provide enhanced Doppler frequency resolution and diminished range spectrum. On the other hand, if the mode decision circuit has selected parking assistance mode, then the transmit sequence may be adapted to enhance range resolution, and diminish velocity resolution by decreasing the frequency spectrum of the step frequency sweeps and/or increasing the number of step frequencies in a sweep at the expense of the number of sweeps per complete measurement set.

Next, the antenna 109 receives the reflected signals and feeds them to the receive module 107. The receive module is essentially conventional and receives the signals, conditions them, including typically frequency down converting them. The conditioned and frequency down converted information is then forwarded to the phase rotation and matrix population module 114 in the DSP 103. The phase rotation module extracts the phase difference information for each sample and populates a matrix in accordance with the scheme for the particular mode as decided by the mode decision circuit 111 that corresponds to the transmit sequence as determined by the transmit sequence controller 113.

The data from the matrix is then forwarded to the signal processing module 117. Here, the data can be processed using conventional techniques to determine any one or more of various pieces of desired information, such as the number of objects in the field of view of the radar system and their ranges and velocities.

Although not shown in the diagram, the DSP 103 also will be determining other information such as the bearing to the objects in the field of view. The DSP then might send a signal 124 to the vehicle control system 121 if it detects a condition that the driver should be alerted to, such as a potential collision. It should be understood, however, that in more sophisticated systems, the DSP may control the vehicle control system 121 to actually take action as opposed to simply alert the driver. For instance, in collision avoidance, if the system 100 determines that the vehicle is fast approaching another vehicle in front of it, it may apply the brakes.

Figure 2A:
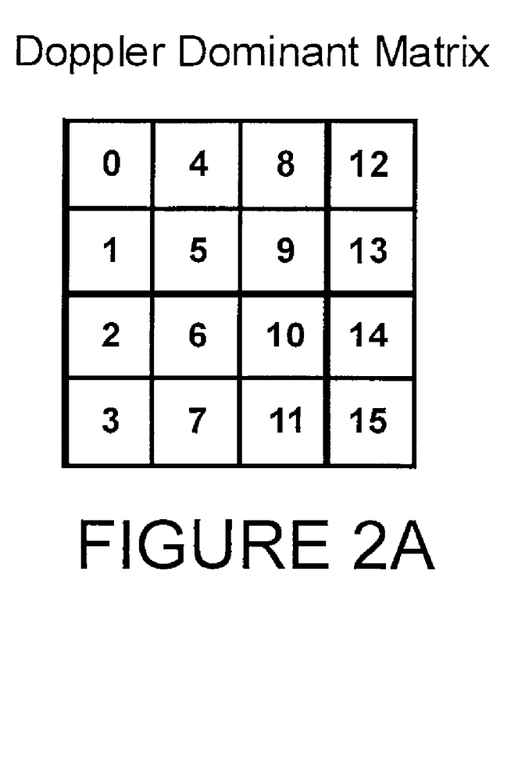
FIGS. 2A and 2B are matrices illustrating two exemplary ways of organizing radar sample data so as to maximize Doppler resolution and range spectrum, respectively.
Figure 2B:
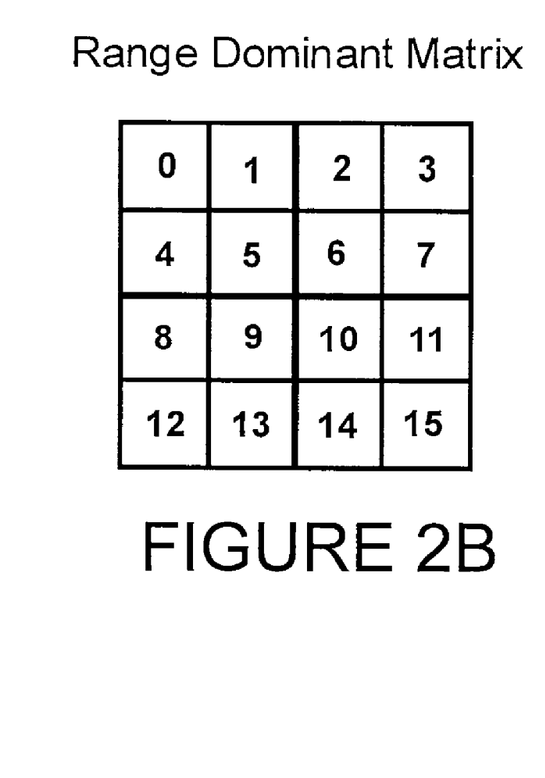

The trade-off between Doppler resolution and range spectrum is not a function of only the relative number of rows and columns in the matrix. The Doppler resolution and range spectrum resolution also are affected by the order in which the samples are taken. FIGS. 2A and 2B help illustrate this concept. FIG. 2A illustrates a matrix populated in an order adapted to fully maximize Doppler resolution (hereinafter termed a "Doppler dominant" matrix). FIG. 2B, on the other hand, illustrates a matrix populated in an order adapted to fully maximize the range spectrum (hereinafter termed a "range dominant" matrix). In FIGS. 2A and 2B, the number written in each box is the sequence number corresponding to the sample placed in that box. Thus, the sample number indicates the time at which the sample was taken. Assuming for example that a sample is taken every 0.001 seconds, then sample number 0 is taking time t=0, sample 1 is taken time t=0.001 seconds, sample 2 is taken at time t=0.002 seconds, sample 3 is taken at time t=0.003 seconds, sample 4 is taking at time t=0.004 seconds, etc. However, it should be understood that there is no requirement that the samples be taken at fixed intervals. In some cases, there may be an advantage to staggering the transmission and sample acquisition timing, as in the case of PRF (pulse repetition frequency) jitter to remove range ambiguity or to alter the spectral power distribution.

It should be apparent from the fact that the matrices in FIGS. 2A and 2B are 4×4 that there are 16 samples per complete measurement set and that, in FIG. 2B, for instance, those 16 samples are comprised of four repeats of a stepped frequency sweep, each stepped frequency sweep comprises four frequency bins. Specifically, we know that there are four frequency bins because there are four columns in the matrix (each column corresponding to a different frequency). Likewise, we know that the frequency sweep is performed four times per complete measurement set because there are four rows in the matrix (wherein the number of rows indicate the number of samples per column that were taken at the same frequency).

Figure 3A:
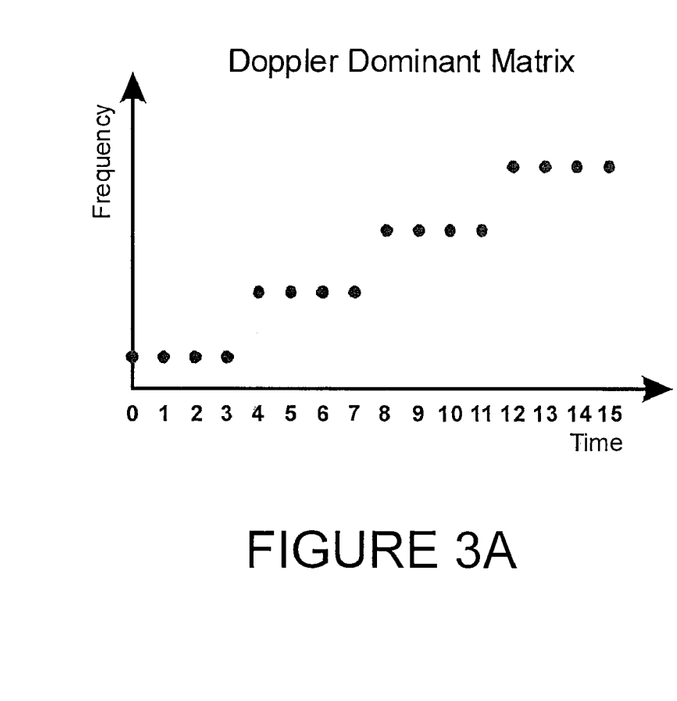
FIG. 3A and 3B are frequency versus time graphs corresponding to the matrices of FIGS. 2A and 2B, respectively, illustrating transmit signal sequences of the radar system.

In the Doppler dominant matrix of FIG. 2A, it can be seen that the data is collected in an unconventional manner in which all of the samples at a given frequency are taken in a row followed by all of the samples at the next frequency, etc until the matrix is filled. For sake of complete clarity, FIG. 3A is a graph corresponding to the matrix of FIG. 2A showing the transmit frequency of the samples as a function of time for the 16 samples in the complete measurement set. The numbers running along the horizontal time axis in FIG. 3A are the sample sequence numbers. Table I below shows the same information as FIGS. 2A and 3A, but in table form.

TABLE I

| Sample Number | Time | Frequency |
|---|---|---|
| 0 | 0.00 seconds | 4.0000 GHz |
| 1 | 0.01 seconds | 4.0000 GHz |
| 2 | 0.02 seconds | 4.0000 GHz |
| 3 | 0.03 seconds | 4.0000 GHz |
| 4 | 0.04 seconds | 4.0005 GHz |
| 5 | 0.05 seconds | 4.0005 GHz |
| 6 | 0.06 seconds | 4.0005 GHz |
| 7 | 0.07 seconds | 4.0005 GHz |
| 8 | 0.08 seconds | 4.0010 GHz |
| 9 | 0.09 seconds | 4.0010 GHz |
| 10 | 0.10 seconds | 4.0010 GHz |
| 11 | 0.11 seconds | 4.0010 GHz |
| 12 | 0.12 seconds | 4.0015 GHz |
| 13 | 0.13 seconds | 4.0015 GHz |
| 14 | 0.14 seconds | 4.0015 GHz |
| 15 | 0.15 seconds | 4.0015 GHz |

Thus, in FIGS. 2A and 3A, the time difference between each sample in a given column (i.e., each sample having the same frequency) is minimized, i.e., 0.01 seconds, while the time difference between each sample in a given row (each sample having a different frequency) is maximized, i.e., 0.04 seconds. Thus, this Doppler dominant matrix has maximized velocity resolution (because the time difference between samples of the same frequency is minimized) and has minimized range spectrum (because the time difference between the samples at different frequencies is maximized).

Figure 3B:
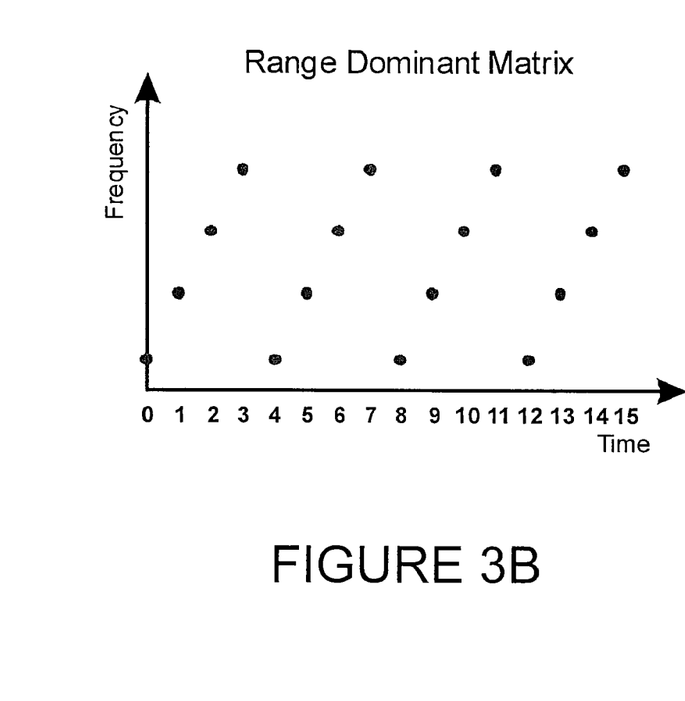

In the range dominant matrix of FIG. 2B, it can be seen that the data is collected in a more conventional manner in which the frequency is stepped over the full frequency range such that four consecutive samples are taken at four different frequency bins and then the stepped frequency sweep is performed again with four more consecutive samples taken at four different frequencies and this is repeated two more times for a total of four stepped frequency sweeps per complete measurement set (i.e., per matrix). For sake of clarity, FIG. 3B is a graph corresponding to the range dominant matrix of FIG. 2B showing the frequency of the samples as a function of time for the 16 samples in the exemplary complete measurement set. Table II below illustrates the same information shown in FIGS. 2B and 3B, but in table form.

TABLE II

| Sample Number | Time | Frequency |
|---|---|---|
| 0 | 0.00 seconds | 4.0000 GHz |
| 1 | 0.01 seconds | 4.0005 GHz |
| 2 | 0.02 seconds | 4.0010 GHz |
| 3 | 0.03 seconds | 4.0015 GHz |
| 4 | 0.04 seconds | 4.0000 GHz |
| 5 | 0.05 seconds | 4.0005 GHz |
| 6 | 0.06 seconds | 4.0010 GHz |
| 7 | 0.07 seconds | 4.0015 GHz |
| 8 | 0.08 seconds | 4.0000 GHz |
| 9 | 0.09 seconds | 4.0005 GHz |
| 10 | 0.10 seconds | 4.0010 GHz |
| 11 | 0.11 seconds | 4.0015 GHz |
| 12 | 0.12 seconds | 4.0000 GHz |
| 13 | 0.13 seconds | 4.0005 GHz |
| 14 | 0.14 seconds | 4.0010 GHz |
| 15 | 0.15 seconds | 4.0015 GHz |

Thus, in the exemplary matrix of FIGS. 2B and 3B (and Table II), the time difference between each sample in a given column (i.e., each sample having the same frequency) is maximized; i.e., 0.04 seconds, while the time difference between each sample in a given row (each sample having a different frequency) is minimized, i.e., 0.01 seconds. Thus, this range dominant matrix maximizes the range spectrum because the time difference between samples of the same frequency is maximized and minimizes Doppler/velocity resolution because the time difference between the samples at different frequencies is minimized.

Figure 4:
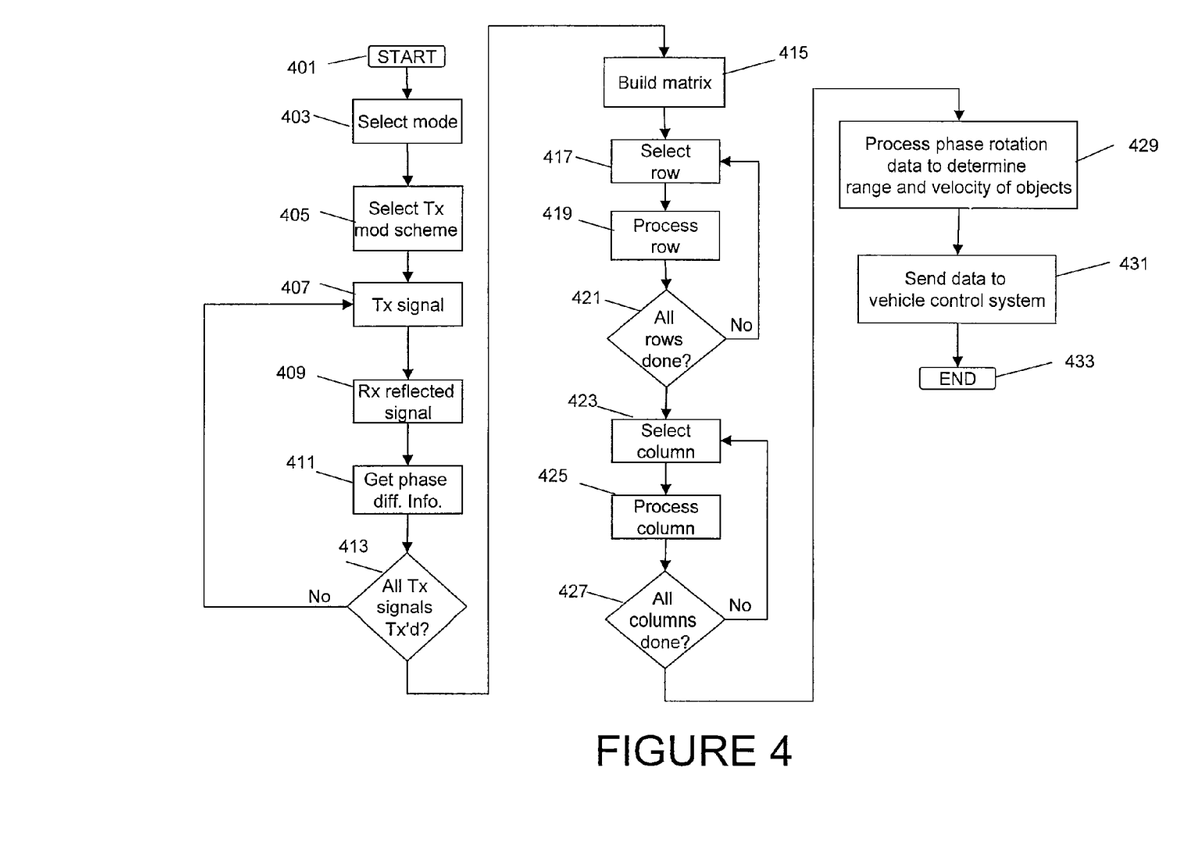
FIG. 4 is a flow chart of processing in accordance with one embodiment of the present invention.

FIG. 4 is a flow diagram illustrating operation in accordance with one embodiment of the invention. The process starts at step 401. In step 403, a decision is made as to what mode (e.g., parking assistance mode or collision avoidance mode) the system is to operate in. Next in step 405, the system picks a transmit modulation scheme particularly adapted to the selected operation mode. Next, in step 407, the system transmits a single transmitter signal. In step 409, it receives the reflected signal responsive to the transmitted signal. In step 411, it determines and stores the phase difference between the transmitted signal and the received signal.

Next, in decision step 413, it is determined if all of the transmit signals in a complete measurement set have been transmitted. If not, flow returns to step 407 where the next transmit signal is cued up. Steps 407, 409, 411, 413, and 415 are repeated until all of the transmit signals for the complete measurement set have been transmitted. When this is done, flow proceeds from step 413 to step 415. In step 415, the matrix is built in accordance with the selected scheme corresponding to the selected mode of operation.

Next in step 417, a row is selected. Then, in step 419, the sample data for the selected row is processed to determine the phase rotation frequency for that row. This may include, for instance, converting the data to the frequency domain such as live fast Fourier transform (FFT) and extracting the dominant frequency in the data. Next in decision step 421, it is determined if all the rows have been processed. If not, flow returns to step 417 to select the next row. Process flows through steps 417, 419, and 421 until all the rows have been processed. When all the rows have been processed, flow instead proceeds from step 421 to step 423 where a column is selected and processed to obtain the column frequency. Next in decision step 425, it is determined if all the columns have been processed. If not, flow returns to step 423 where the next column is selected and then steps 423, 425, and 427 are repeated until all the columns have been processed. When all the columns have been processed, flow proceeds from step 427 to step 429.

In step 429, all of the phase rotation data from each column and each row is processed to calculate the range and velocity of the objects in the field of view of the radar. Note that at least part of this process includes correlating all the different row phase rotations with each other to determine the most likely phase rotation. In a simplest embodiment, this may simply comprise averaging all of the phase rotation data in the rows. However, in more practical systems, the scheme will be much more complicated. The same process needs to be performed with the phase rotation data from each column. Then, the Doppler frequencies of the objects in the field of view of the radar can be determined from the column data, the range frequency and Doppler frequency can be determined from the row data, the range data can be extracted by comparing the row data to the column data, and then the number of objects in the field of view of the radar and their individual ranges and velocities can be calculated. In step 431, this data is sent to the vehicle control system for it to take any appropriate actions based on the data. The process ends at step 433.

Thus, it can be seen that the two-dimensional approach of the present invention permits easy customization of a complete date set to adapt the radar system to different applications by either or both (1) changing the temporal sequence in which the samples are taken and (2) adjusting the dimensions of the two-dimensional arrangement of the data (changing the number of rows and columns in the matrix).

Both of these types of adjustment involve changing the order in which the radar transmit frequency is altered from sample to sample. However, the computational algorithm for generating useful range and velocity data of obstacles remains essentially unchanged.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A radar method for determining the range to at least one object and a velocity of the object comprising:
transmitting sequentially a plurality of RF signals, each of said plurality of RF signals comprising a particular frequency and being transmitted during a particular unique finite period, the plurality of signals collectively comprising at least one first subset of signals having the same frequency and at least one second subset of signals having different frequencies;
receiving the plurality of signals after reflection from an object;
determining a phase difference between each of the signals and the corresponding reflected signal, each said phase difference herein termed a sample;
organizing the samples in two-dimensions wherein, in a first dimension, all samples have the same frequency and, in a second dimension, all samples have different frequencies;
processing the samples in the first dimension to determine a phase rotation frequency corresponding to the samples in the first dimension, the phase rotation frequency comprising a Doppler frequency for the at least one object;
processing the samples in the second dimension to determine a second phase rotation frequency corresponding to the samples in the second dimension; the phase rotation frequency comprising Doppler frequency and range frequency for that at least one object;
comparing the first phase rotation frequency to the second phase rotation frequency to distinguish range frequency from Doppler frequency of the at least one object; and
converting the Doppler frequency to a velocity of the at least one object and converting the range frequency to a range of that at least one object.

2. The method of claim 1 wherein the object comprises multiple objects.

3. The method of claim 1 wherein the plurality of transmitted RF signals are transmitted sequentially with a fixed time interval between consecutive signals.

4. The method of claim 1 wherein the transmitted signals are transmitted sequentially as a plurality of identical frequency sweeps to produce a data set having maximized Doppler frequency resolution.

5. The method of claim 1 wherein the transmitted signals are transmitted sequentially such that the signals comprising each subset of signals having the same frequency are transmitted consecutively to produce a data set having maximized range frequency resolution.

6. The method of claim 1 further comprising:
adjusting the signals in the plurality of transmitted signals and the size of the first and second dimensions as a function of an application of the method.

7. The method of claim 1 further comprising adjusting the size of the first and second dimensions as a function of an application of the method.

8. The method of claim 1 further comprising:
adjusting the sequence of transmit signals as a function of an application of said method.

9. The method of claim 1 wherein the organizing comprises arranging the samples in a two-dimensional matrix, the matrix comprising a plurality of rows and a plurality of columns.

10. The method of claim 9 wherein each row has a corresponding phase rotation frequency and each column has a corresponding phase rotation frequency.

11. The method of claim 9 wherein the processing comprises calculating a phase rotation frequency for each row in said matrix and calculating a phase rotation frequency for each column in the matrix.

12. A method of claim 11, correlating the phase rotation frequencies for the plurality of rows to generate a single predicted phase rotation frequency for the rows and correlating the phase rotation frequencies for the plurality of columns to generate a single predicted phase rotation frequency for the columns.

13. A computer program product comprising computer executable code for controlling a radar system to transmit radar signals and to process received data as to the reflections of the transmitted radar signals, the computer program product comprising:
computer executable code for causing the radar system to sequentially transmit a plurality of radio frequency signals, each of the plurality of radio frequency signals comprising a particular frequency and being transmitted during a particular unique finite time period, the plurality of signals collectively comprising a subset of signals having the same frequency and a subset of signals having different frequencies;
computer executable code for receiving the plurality of transmitted signals after reflection from an object;
computer executable code for determining a phase difference between each of the transmitted signals and the corresponding reflected signal, each said phase difference herein termed a sample;

computer executable code for organizing the samples in two-dimensions wherein, in a first dimension, all samples have the same frequency and, in a second dimension, all samples have different frequencies;

computer executable code for processing the samples in the first dimension to determine first phase rotation frequency information corresponding to the samples in the first dimension, the first phase rotation frequency comprising only Doppler frequency information for objects in a field of view of the radar system;

computer executable code for processing the samples in the second dimension to determine second phase rotational frequency information corresponding to the samples in the second dimension, the second phase rotation frequency comprising Doppler frequency information and range frequency information for objects in the field of view of the radar system;

computer executable code for comparing the first phase rotation frequency to the second phase rotation frequency to distinguish a range frequency from Doppler frequency for the objects in the field of view of the radar system; and computer executable code for converting the Doppler frequency information to information as to the velocities of the objects in the field of view of the radar system and for converting the range frequency information to information as to the range of the objects in the field of view of the radar system.

14. The computer program product of claim 13 wherein the time period between consecutive transmitted signals is constant.

15. The computer program product of claim 13 further comprising:

computer executable code for adjusting the size of the first and second dimensions as a function of an application of the computer program product.

16. The computer program product of claim 13 further comprising:

computer executable code for adjusting the sequence of transmit signals as a function of an application of said computer program product.

17. The computer program product of claim 1 wherein the computer executable code for organizing comprises computer executable code for arranging the samples in a two-dimensional matrix, the matrix comprising a plurality of rows and a plurality of columns.

18. The computer program product of claim 17 wherein each row has a corresponding phase rotation frequency and each column has a corresponding phase rotation frequency and wherein the computer executable code for processing the samples in the first dimension and the computer executable code for processing the samples in the second dimension comprise computer executable code for calculating a phase rotation frequency for each row in said matrix and calculating a phase rotation frequency for each column in the matrix, respectively, and correlating the phase rotation frequencies for the plurality of rows to generate a single predicted phase rotation frequency for the rows and correlating the phase rotation frequencies for the plurality of columns to generate a single predicted phase rotation frequency for the columns.

19. A radar system comprising:

an antenna;

a transmitter coupled to the antenna for producing radio frequency signals to be transmitted by the antenna;

a receiver coupled to the antenna for receiving reflected signals received responsive to the transmitted signals;

means for causing the transmitter antenna to sequentially transmit a plurality of radio frequency signals, each of the plurality of radio frequency signals comprising a particular frequency and being transmitted during a particular unique finite time period, the plurality of signals collectively comprising at least one first subset of signals having the same frequency and at least one second subset of signals having different frequencies;

means for determining a phase difference between each of the transmitted signals and the corresponding reflected signal, each said phase difference herein termed a sample;

means for processing samples corresponding to the same transmit frequency to determine first phase rotation frequency, the first phase rotation frequency comprising only Doppler frequency information for objects in a field of view of the radar system;

means for processing samples corresponding to transmit signals that were sequentially separated from each other by a fixed time interval to determine second phase rotation frequency, the second phase rotation frequency comprising Doppler frequency information and range frequency information for objects in the field of view of the radar system; and means for comparing the first phase rotation frequency to the second phase rotation frequency to distinguish range frequency from Doppler frequency for the objects in the field of view of the radar system.

* * * * *